(12) United States Patent
Crawford

(10) Patent No.: US 8,070,170 B2
(45) Date of Patent: Dec. 6, 2011

(54) TILT DEVICE FOR A MATERIAL HANDLING MACHINE

(75) Inventor: Patrick Lee Crawford, Shawano, WI (US)

(73) Assignee: Timberpro, Inc., Shawano, WI (US)

( * ) Notice: Subject to any disclaimer, the term of this patent is extended or adjusted under 35 U.S.C. 154(b) by 87 days.

(21) Appl. No.: 12/741,115

(22) PCT Filed: Nov. 10, 2008

(86) PCT No.: PCT/US2008/082947
§ 371 (c)(1),
(2), (4) Date: May 3, 2010

(87) PCT Pub. No.: WO2009/064687
PCT Pub. Date: May 22, 2009

(65) Prior Publication Data
US 2010/0264694 A1   Oct. 21, 2010

(51) Int. Cl.
*B60G 17/00* (2006.01)
(52) U.S. Cl. ............ 280/6.154; 180/89.14; 37/213; 37/397; 37/412
(58) Field of Classification Search ......... 180/89.14, 180/89.15; 280/6.154; 37/231, 397, 412
See application file for complete search history.

(56) References Cited

U.S. PATENT DOCUMENTS

| 374,217 | A | 12/1887 | Vincent et al. | 105/443 |
|---|---|---|---|---|
| 691,872 | A | 1/1902 | Rehkopf | 182/90 |
| 1,436,414 | A | 11/1922 | Stanwood | 280/169 |
| 2,024,499 | A | 12/1935 | Baron | 74/594.4 |
| 2,305,016 | A | 12/1942 | Leppla | 52/668 |
| 2,414,573 | A | 1/1947 | Wagner et al. | 212/70 |
| 2,860,822 | A | 11/1958 | Smith et al. | 182/93 |
| 3,033,309 | A | 5/1962 | Fugere | 182/90 |
| 3,233,909 | A | 2/1966 | Boone | 280/6 |
| 3,238,981 | A | 3/1966 | Larson et al. | 144/34 |

(Continued)

FOREIGN PATENT DOCUMENTS
GB    1487935    10/1977

OTHER PUBLICATIONS

TimberPro LLC, Timber Pro T800 "E" Series Brochure.

(Continued)

*Primary Examiner* — Toan To
(74) *Attorney, Agent, or Firm* — Alan Kamrath; Kamrath & Associates PA

(57) ABSTRACT

A machine (A) includes a frame (16) and a platform (58) on which a boom assembly (B) is mounted. Two arms (332) of a U-shaped pivotal member (330) are pivotably mounted to the frame (16) about a first pivot axis (380) perpendicular to a longitudinal direction of the frame (16). A front end (302) of a mounting plate (310) is pivotably connected to an intermediate section (336) of the pivotal member (330) about a second pivot axis (382) perpendicular to and spaced from the first pivot axis (380). Two rams (400) are mounted on opposite sides of a rear end (304) of the mounting plate (310). Each ram (400) includes a lower end (404) pivotably connected to the frame (16) and an upper end (402) pivotably connected to one of the sides of the mounting plate (310). The boom assembly (B), the mounting plate (310), and the pivotal member (330) pivot about the first pivot axis (380) and/or the second pivot axis (382) relative to the frame (16) due to relative movement of the rams (400).

20 Claims, 3 Drawing Sheets

U.S. PATENT DOCUMENTS

| | | | |
|---|---|---|---|
| 3,269,436 A | 8/1966 | Moore | 144/3 |
| 3,341,247 A | 9/1967 | Martinmaas | 296/190.08 |
| 3,477,588 A | 11/1969 | Reischl | 212/55 |
| 3,498,350 A | 3/1970 | Maradyn | 144/309 |
| 3,572,746 A | 3/1971 | Mueller | 280/112 |
| 3,575,222 A | 4/1971 | Tucek | 144/34 |
| 3,599,801 A | 8/1971 | Roll | 212/35 |
| 3,601,169 A | 8/1971 | Hamilton et al. | 144/34 R |
| 3,670,834 A | 6/1972 | Rogers | 180/41 |
| 3,708,000 A | 1/1973 | Duffty et al. | 144/3 D |
| 3,720,245 A | 3/1973 | Puna | 144/3 D |
| 3,727,653 A | 4/1973 | Tucek | 144/34 E |
| 3,763,905 A | 10/1973 | Hamilton et al. | 144/3 D |
| 3,807,586 A | 4/1974 | Holopainen | 214/138 R |
| 3,951,431 A | 4/1976 | Hopkins | 280/166 |
| 3,977,547 A | 8/1976 | Holopainen | 214/131 R |
| 3,981,336 A | 9/1976 | Levesque | 144/3 D |
| 4,063,359 A | 12/1977 | Luscombe | 30/379.5 |
| 4,071,260 A | 1/1978 | Marshall, Sr. | 280/166 |
| 4,095,839 A | 6/1978 | Lawrence et al. | 296/28 C |
| 4,102,461 A | 7/1978 | Soyland | 214/132 |
| D249,523 S | 9/1978 | Segales | D15/30 |
| 4,194,787 A | 3/1980 | Williamsen | 298/23 M |
| 4,324,317 A | 4/1982 | Winkelblech | 187/267 |
| 4,326,571 A | 4/1982 | Crawford | 144/34 E |
| 4,365,927 A | 12/1982 | Schenck | 414/729 |
| 4,459,061 A | 7/1984 | Klement | 403/163 |
| 4,565,486 A | 1/1986 | Crawford et al. | |
| 4,583,908 A | 4/1986 | Crawford | 414/694 |
| 4,605,257 A | 8/1986 | Lang et al. | 296/26.03 |
| D288,206 S | 2/1987 | Moscovitch | D15/30 |
| 4,650,017 A | 3/1987 | Pelletier et al. | |
| D292,632 S | 11/1987 | Lich | D34/37 |
| 4,907,667 A | 3/1990 | Yamamoto et al. | 180/89.13 |
| 5,016,721 A | 5/1991 | Yamamoto et al. | 180/89.13 |
| 5,033,582 A | 7/1991 | Hoben | 182/85 |
| 5,096,253 A | 3/1992 | Jo et al. | 296/190 |
| 5,273,340 A | 12/1993 | Nelson et al. | 296/190 |
| 5,337,847 A | 8/1994 | Woods et al. | |
| D366,267 S | 1/1996 | Lepoix | D15/30 |
| 5,553,993 A | 9/1996 | Gilbert et al. | 414/739 |
| D389,984 S | 1/1998 | Johansson | D34/37 |
| D391,273 S | 2/1998 | Linder | D15/30 |
| D394,069 S | 5/1998 | Muranen | D15/30 |
| D398,616 S | 9/1998 | Kwak et al. | D15/30 |
| 5,840,396 A | 11/1998 | Betz | 428/67 |
| 5,931,247 A | 8/1999 | Peterson | 180/89.1 |
| D427,612 S | 7/2000 | Shim | D15/23 |
| D432,145 S | 10/2000 | Kraft et al. | D15/30 |
| D433,689 S | 11/2000 | Kraft et al. | D15/30 |
| 6,155,632 A | 12/2000 | Fujimoto | 296/190.08 |
| 6,170,588 B1 | 1/2001 | Irino et al. | 180/89.1 |
| 6,244,369 B1 | 6/2001 | Yunoue et al. | 180/89.12 |
| D455,763 S | 4/2002 | Brandenburg, III et al. | D15/30 |
| 6,394,212 B1 | 5/2002 | Takano et al. | 180/89.13 |
| D463,461 S | 9/2002 | Yanagida et al. | D15/30 |
| D463,462 S | 9/2002 | Yanagida et al. | D15/30 |
| D463,807 S | 10/2002 | Tamaru et al. | D15/30 |
| 6,499,556 B1 * | 12/2002 | Koyama | 180/311 |
| 6,502,896 B1 | 1/2003 | Nakata et al. | 296/190.05 |
| D471,213 S | 3/2003 | Kwak et al. | D15/30 |
| D481,044 S | 10/2003 | Tokach et al. | D15/30 |
| 6,662,836 B1 * | 12/2003 | Andersen | 144/34.5 |
| 6,669,272 B2 | 12/2003 | Ayabe et al. | 296/190.08 |
| 6,772,544 B2 * | 8/2004 | Takemura et al. | 37/347 |
| D505,432 S | 5/2005 | Antonetti | D15/30 |
| D523,029 S | 6/2006 | Crawford et al. | D15/30 |
| 7,481,289 B2 * | 1/2009 | Ueda et al. | 180/89.16 |
| 7,500,532 B2 * | 3/2009 | Koga et al. | 180/89.13 |
| 7,503,419 B2 * | 3/2009 | Miyake | 180/327 |
| 7,699,328 B2 | 4/2010 | Crawford | 280/166 |
| 7,730,647 B2 * | 6/2010 | Kubo et al. | 37/397 |
| 7,832,740 B2 * | 11/2010 | Kim et al. | 280/6.154 |
| 2007/0145759 A1 | 6/2007 | Crawford et al. | 296/1.01 |
| 2009/0314566 A1 | 12/2009 | Rust | |

OTHER PUBLICATIONS

TimberPro LLC, Timber Pro TB620-E Brochure.

\* cited by examiner

TILT DEVICE FOR A MATERIAL HANDLING MACHINE

BACKGROUND OF THE INVENTION

The present invention relates to a tilt device for a machine, particularly to a tilt device for a machine including a boom assembly and, more particularly, to a four-way tilt device for a mobile material handling machine.

The introduction of tree handling apparatus represented by U.S. Pat. Nos. 4,326,571; 4,565,486; and 4,583,908 obtained a significant advantage in the marketplace in selectively cutting from a row of trees. This arose due to its ability to rotate its platform throughout 360° within the overall width of the apparatus which is able to pass between adjacent rows of trees. Improvements to the initial machine represented in U.S. Pat. No. 4,326,571 included the ability to maintain the platform level while the apparatus worked on slopes such as mountain sides.

However, even such excellent devices have experienced some limitations for which further improvement was needed. In particular, a circular base is mounted below a turntable on which the platform is mounted, and upper ends of two rams are attached to the circular base to tilt the platform by moving the rams in an extending direction or a retracting direction. Two additional rams are mounted between the circular base and the frame. The overall height of the apparatus is relatively high and, thus, results in limitation such as the ability to pass under some bridges when being transported on trucks. Furthermore, the circular base is heavy and expensive and restricts access for maintenance.

A need exists for a tilt device for a machine such as a material handing machine that has a low profile while allowing tilt of the mounting plate and allowing easy maintenance of the machine as well as 360° rotation of components mounted to the mounting plate.

BRIEF SUMMARY OF THE INVENTION

The present invention solves this need and other problems in the field of tilt devices by providing, in a preferred form, a machine including a frame and a mounting plate above the frame. A boom assembly and, in the most preferred form, a cab are mounted on the mounting plate. In the most preferred form, a pivotal member includes two arms and an intermediate section between the arms. The arms are pivotably connected to the frame by two pins defining a first pivot axis perpendicular to a longitudinal direction of the frame. The mounting plate includes a front end pivotably connected to the intermediate section of the pivotal member by an axis pin defining a second pivot axis perpendicular to and spaced from the first pivot axis. Left and right rams are pivotably connected by first and second spindles to opposite sides of a rear end of the mounting plate at upper ends thereof. Lower ends of the rams are pivotably connected by third and fourth spindles to the frame. The rams are operable to move either synchronously or independently between an extended position and a retracted position.

When the rams move synchronously in the extending or retracting direction at the same rate, the mounting plate and the pivotal member pivot forward or rearward relative to the frame about the first pivot axis. When one of the rams moves in the extending direction while the other ram does not move or when the rams moves in different directions at the same rate, the mounting plate pivots rightward or leftward relative to the frame and the pivotal member about the second pivot axis. When the rams move in the same direction at different rates, the mounting plate pivots leftward or rightward relative to the frame and the pivotal member about the second pivot axis as well as the mounting plate and the pivotal member pivot forward or rearward relative to the frame about the first pivot axis.

The cab and the boom assembly are rotatable about a turntable axis that is perpendicular to and intermediate the first and second pivot axes. Furthermore, the turntable axis is intermediate the first and second spindles. Thus, by rotating the mounting plate and moving the rams, the boom and the cab can be adjusted in response to the working surface and the working environment to be in the most appropriate orientation and the most appropriate tilt state for handling material. Thus, the machine according to the preferred teachings of the present invention does not use the expensive circular base of conventional apparatuses and, thus, has reduced overall height and hence less limitation to passing under a bridge or restricted space. Furthermore, the machine according to the preferred teachings of the present invention allows easy access to the frame and the components connected thereto for maintenance without adversely affecting 360° rotation and tilt of the mounting plate relative to the frame.

In the most preferred form, the mounting plate is annular in shape. The front end of the mounting plate includes a pivotal section extending along a tangent to the annular shape. The pivotal section includes a pair of spaced ears parallel to the tangent of the annular shape and through which the axis pin extends. A first pair of lugs are formed on a left side of the rear end of the mounting plate and extended through by the third spindle. A second pair of lugs are formed on a right side of the rear end of the mounting plate and extended through by the fourth spindle. The upper ends of the rams are in universal joint connection with the first and second pairs of lugs. The lower ends of the rams are in universal joint connection with the frame. The universal-joint connections between the upper of the rams and the mounting plate and between the lower ends of the rams and the frame allow smooth tilt of the mounting plate.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
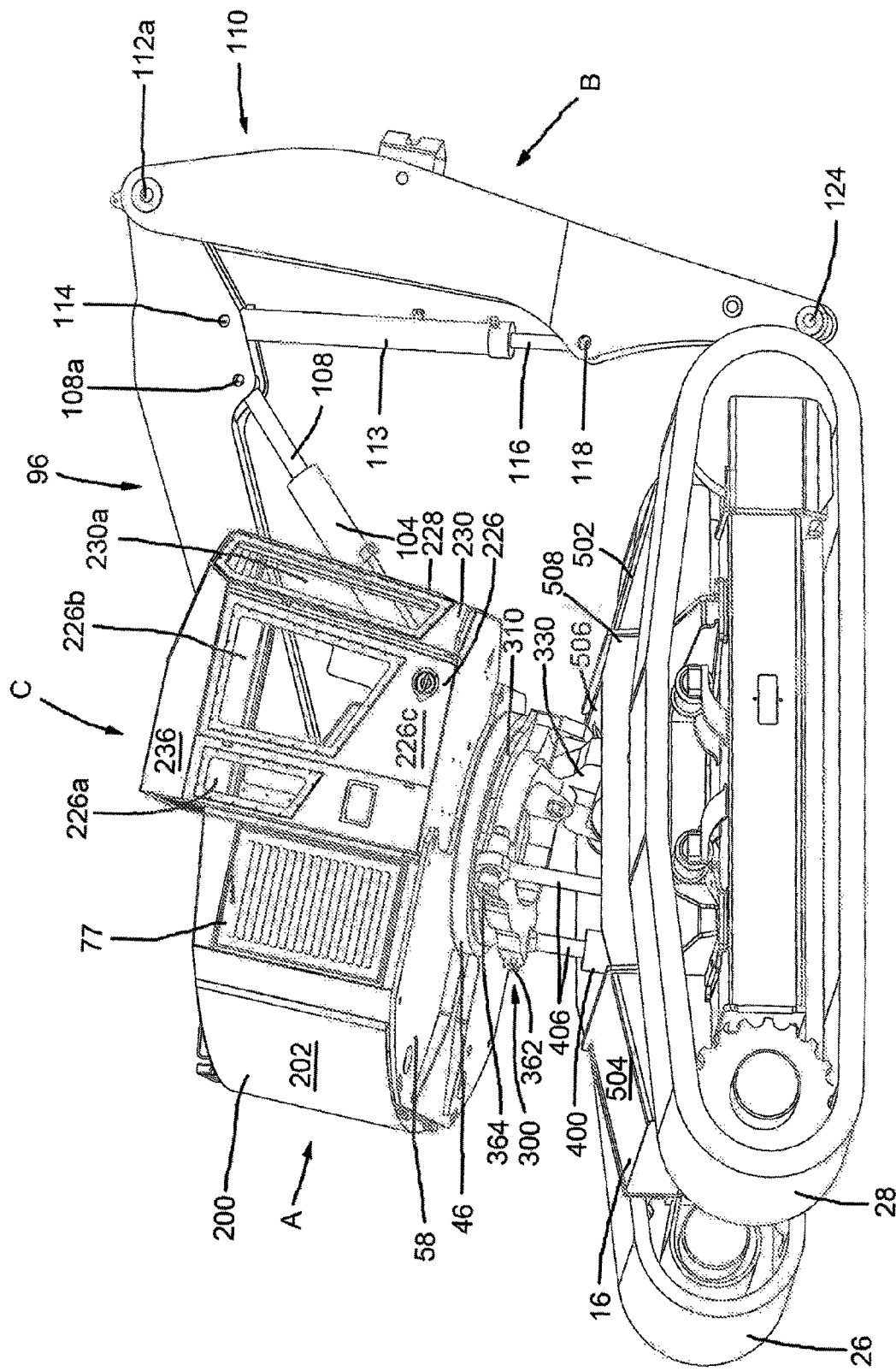
FIG. 1 shows a diagrammatic perspective view of a material handling machine according to the preferred teachings of the present invention.
Figure 2:
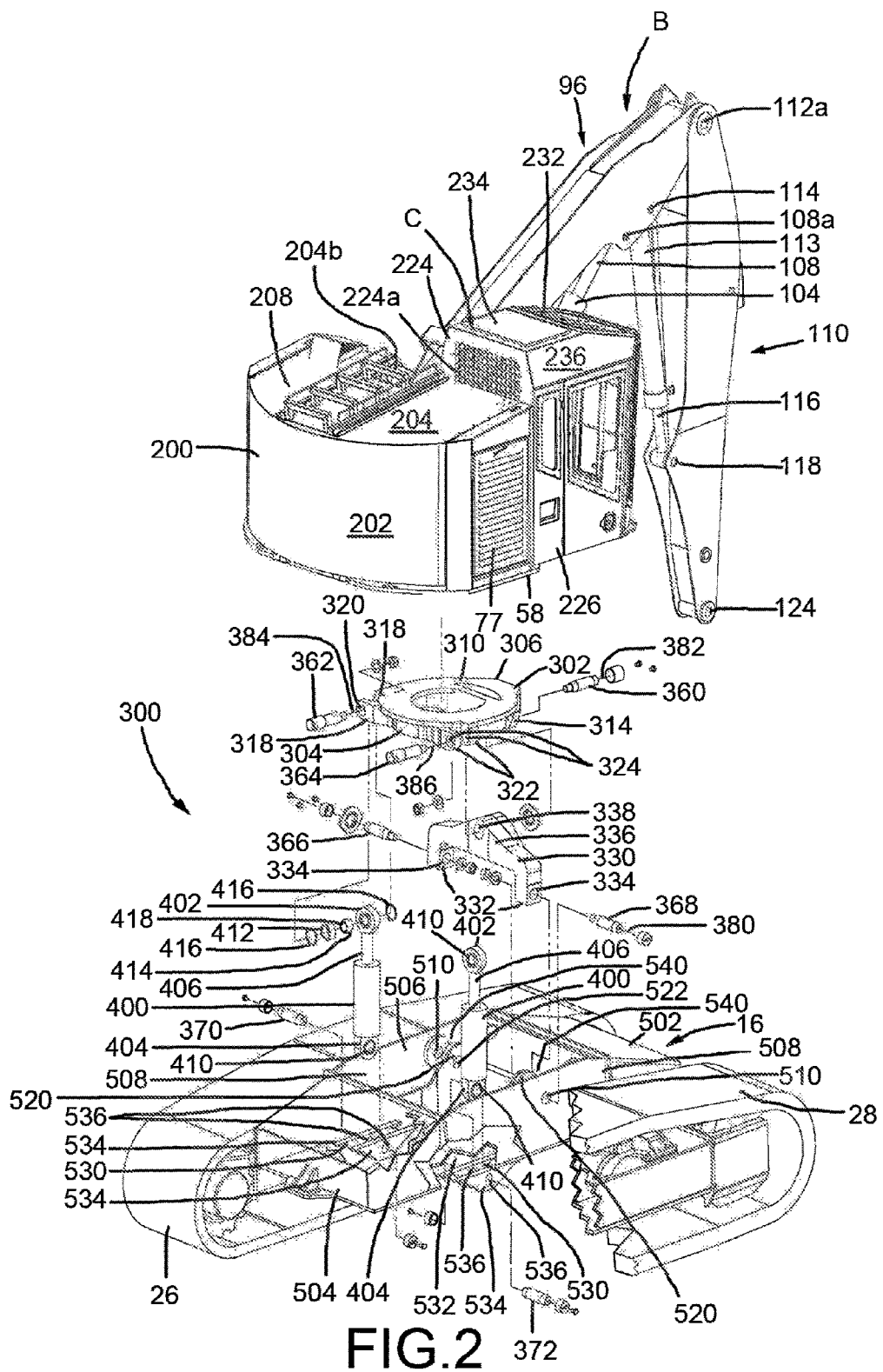
FIG. 2 shows a partly-exploded, partly-cutaway, perspective view of the machine of FIG. 1.
Figure 3:
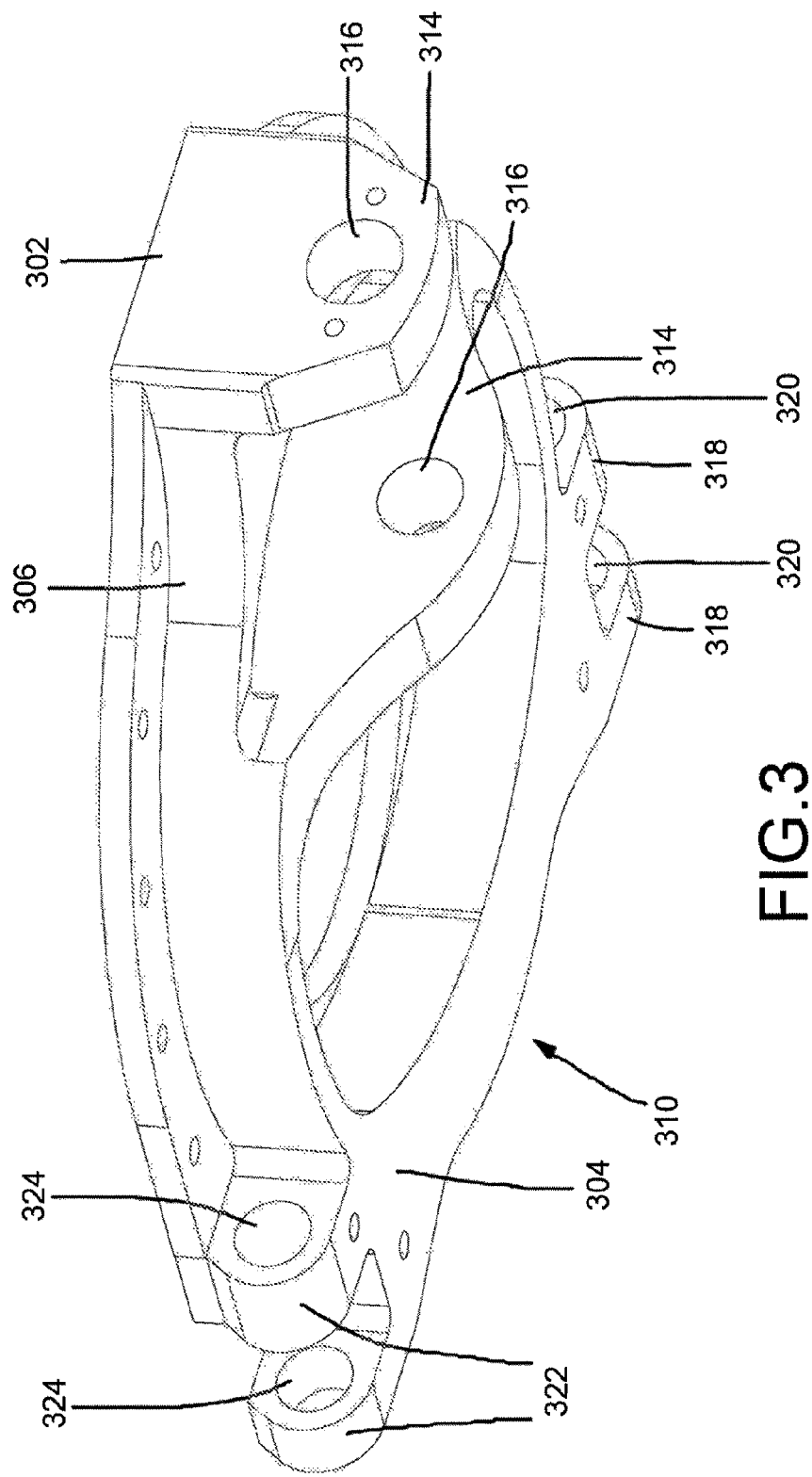
FIG. 3 shows a bottom perspective view of a mounting plate of the material handling machine of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "fourth", "fifth", "lower", "upper", "end", "left", "right", "portion", "section", "longitudinal", "tangent", "lateral", "horizontal", "vertical", "annular", "outward", "inward", "spacing", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A material handling machine according to the preferred teachings of the present invention is shown in the drawings and generally designated A. Machine A can be utilized to handle materials including but not limited to fell and handle trees. Generally, machine A includes a longitudinally extending frame 16 having a front end 502, a rear end 504, and a compartment 506 between front and rear ends 502 and 504. In the preferred form shown, frame 16 includes two parallel, spaced lateral walls 508 parallel to the longitudinal direction of frame 16 between front and rear ends 502 and 504 and defining the compartment 506. Lateral walls 508 include aligned pin holes 510 in front portions thereof adjacent to front end 502.

Two plates 520 are mounted in the compartment 506 on a bottom plate 532 and parallel to and spaced from lateral walls 508 by spacings 540. Plates 520 include pin holes 522 aligned with pin holes 510 of lateral walls 508. Two aligned grooves 530 are defined in a rear portion of bottom plate 532 of compartment 506. In the preferred form shown, each groove 530 is defined by inner and outer brackets 534 having aligned spindle holes 536. In the most preferred form shown, each outer bracket 534 extends downward from a rear portion of one of lateral walls 508 parallel to the longitudinal direction of frame 16. Each inner bracket 534 extends downward from bottom plate 532 parallel to the longitudinal direction of frame 16. It can be appreciated that inner brackets 534 can be integrally formed with or part of plates 520. In a preferred form, machine A is mobile, and in the most preferred form, suitable provisions are provided on frame 16 for providing mobility upon a work surface such as the earth. Specifically, in the form shown, two endless driving tracks 26 and 28 are mounted on opposite sides of frame 16 to provide frame 16 with mobility along the work surface in the longitudinal direction. It can be appreciated that tracks 26 and 28 can be replaced with wheels or wheels including a chain system wrapped around individual or multiple wheels.

According to the preferred form, machine A further includes a turntable 46 attached to a platform 58 on which a cab C, a boom assembly B, and a cover 200 are mounted, allowing cab C and boom assembly B to rotate about a turntable axis of turntable 46. In the most preferred embodiment of the present invention shown, cab C, boom assembly B, and cover 200 are of the types shown and described in the U.S. patent application Ser. No. 11/306,434. The description of the common numerals and cab C, boom assembly, B, and cover 200 may be found herein and in U.S. patent application Ser. No. 11/306,434 and in U.S. Pat. Nos. 4,326,571; 4,565,486; and 4,583,908, which are hereby incorporated herein by reference. However, it is appreciated that other forms of cab C, boom assembly B, and cover 200 would be within the skill of the art.

According to the preferred form shown, cab C includes a back partition 224 extending generally perpendicularly from platform 58. Back partition 224 can include a window 224a having suitable grills for safety reasons. Cab C further includes inner and outer side partitions 226 extending parallel to and spaced from each other and extending generally perpendicularly to back partition 224. Each of side partitions 226 includes rear and front windows 226a and 226b. In the most preferred form shown, outer side partition 226 includes a door 226c having window 226b and which is hinged to allow access into cab C by an operator. Cab C further includes a front partition 228 located generally parallel to and spaced from back partition 224 and perpendicular to side partitions 226. Located at the bottom of front partition 228 are headlights. Front partition 228 has a window having suitable grills for safety reasons. Cab C further includes inner and outer corner partitions 230 extending between the front edges of side partitions 226 and the side edges of front partition 228. Each corner partition 230 is at an obtuse angle with front partition 228 and at an obtuse angle with side partition 226. In the most preferred form shown, the obtuse angle between corner partition 230 and front partition 228 is 135°, and the obtuse angle between corner partition 230 and side partition 226 is 135°. Corner partition 230 further includes a window 230a. Further, cab C includes a roof window 232 having a front edge generally corresponding to the top edges of front partition 228 and linear portions of corner partitions 230, parallel side edges, and a rear edge extending perpendicularly between the side edges. Cab C further includes a roof partition 234 extending between back partition 224 and roof window 232. Cab C further includes side roof partitions 236 sloping inwardly from side partitions 226.

According to the preferred form shown, boom assembly B includes a main boom member 96 pivoted at its lower end adjacent to inner ends of and between a pair of upstanding boom support plates by a pin defining a boom axis parallel to platform 58 and adjacent to the turntable axis. The boom support plates extend in a parallel, spaced relation to each other and generally perpendicular to platform 58 and turntable 46. Main boom member 96 is mounted for pivotal movement in a vertical boom plane extending perpendicular to platform 58 and parallel to the boom support plates and over the boom support plates and turntable 46.

Further provided is a hydraulic ram 104 pivotally connected at its lower end between outer ends of the boom support plates by another pin defining a ram axis parallel to platform 58 and spaced from and parallel to the boom axis. Ram 104 includes a piston 108 having an upper end pivotally connected adjacent to an upper end of main boom member 96 by a pin 108a. Extension and retraction of hydraulic ram 104 pivots main boom member 96 in the boom plane.

Pivotally connected at its lower end to the upper end of main boom member 96 is an upper boom member 110 by a pin 112a. Upper boom member 110 is pivoted by a hydraulic ram 113 pivotally connected at an end to main boom member 96 by a pin 114. Ram 113 includes a piston 116 having an outer end pivotally connected to upper boom member 110 by a pin 118. Upper boom member 110 further includes a pin 124 at an outer end thereof for connection such as with a processing unit including but not limited to a tree processing member for delimbing and shearing trees. It should be appreciated that accessories of various types for handling material such as earth moving devices, lifting or gripping devices, personnel carriers, and the like which are conventionally attached to boom assemblies B can be utilized in machine A according to the preferred teachings of the present invention.

According to the preferred form shown, cover 200 includes a support panel 202 and a cover panel 204 secured to a top edge of support panel 202. Cover 200 is pivotally mounted to platform 58 by a hinge and can be pivoted relative to platform 58 by a suitable mechanism such as a hydraulic ram or the like so that cover 200 is pivotal between an operating position and a service position. An engine, a radiator, pumps, an air cleaner, a heat exchanger 77, and other operating components can be mounted on platform 58 and enclosed by cover 200 in the operating position and can be maintained or repaired when cover 200 is in the service position. A ladder 208 is slideably mounted to cover panel 204 and can be positioned by removable pin locks over a cutout 204b in cover panel 204 when cover 200 is in the operating position. In the service position, ladder 208 can slide for ease of climbing into cover 200 to allow standing upon support panel 202 for servicing engine, pumps, air cleaner, and other operating components.

According to the preferred teachings of the present invention, a tilt device 300 is provided between frame 16 and turntable 46 for supporting and tilting platform 58, cab C, and boom assembly B. In particular, tilt device 300 allows cab C and boom assembly B to pivot about a first pivot axis 380 perpendicular to the longitudinal direction of frame 16 and a second pivot axis 382 perpendicular to the first pivot axis 380 and parallel to the longitudinal direction of frame 16. In the preferred form shown, tilt device 300 includes a mounting plate 310 mounted to an underside of turntable 46 and/or forming a part of turntable 46. Mounting plate 310 has an annular shape having a front end 302 and a rear end 304 spaced from front end 302 along the second pivot axis 382. Front end 302 includes a pivotal section 306 extending along a tangent to the annular shape. Pivotal section 306 includes a pair of parallel, spaced ears 314 parallel to the tangent of the annular shape and having aligned axis pin holes 316. Formed on left and right sides of rear end 304 are two pairs of spaced lugs 318 and 322 having equal spacing perpendicular to the second pivot axis 382. Lugs 318 extend outward from the left side of rear end 304 and include aligned spindle holes 320. Furthermore, lugs 318 are spaced from each other along a third axis 384 parallel to and spaced from the second pivot axis 382. Lugs 322 extend from the right side of rear end 304 and include aligned spindle holes 324. Furthermore, lugs 322 are spaced from each other along a fourth axis 386 parallel to and spaced from the second pivot axis 382 and the third axis 384. Further, lugs 318 are parallel to and spaced from lugs 322 in a direction parallel to the first pivot axis 380.

According to the preferred form, tilt device 300 further includes a substantially U-shaped pivotal member 330 having two arms 332 and an intermediate section 336 between arms 332. Arms 332 are spaced from each other along the first pivot axis 380 and include aligned pivot holes 334 extending along the first pivot axis 380. Each arm 332 is received in spacing 540 between one of lateral walls 508 and one of plates 520. Tilt device 300 further includes two pins 366 and 368 each extending through pin hole 510 of one of lateral walls 508 of frame 16, pivot hole 334 of one of arms 332, and pin hole 522 of one of plates 520, allowing pivotal movement of pivotal member 330 relative to frame 16 about the first pivot axis 380 defined by pins 366 and 368. Intermediate section 336 is spaced from the first pivot axis 380 in a direction parallel to the second pivot axis 382. In the most preferred form shown, intermediate section 336 of pivotal member 330 includes an axis pin hole 338 extending along the second pivot axis 382. An axis pin 360 is rotatably extended through axis pin hole 338 and axis pin holes 316 of ears 314 at front end 302 of mounting plate 310, allowing mounting plate 310 to pivot relative to pivotal member 330 about the second pivot axis 382 defined by axis pin 360. Pivotal member 330 can be made by any suitable method including but not limited to casting. Pins 360, 366, and 368 can be of any desired form as conventional including but not limited to of a commercially available type.

According to the preferred form, tilt device 300 further includes left and right hydraulic rams 400 each having an upper end 402 pivotably connected to mounting plate 310 and a lower end 404 pivotably connected to frame 16. Rams 400 are operable to move between an extended position and a retracted position. In the most preferred form shown, each ram 400 includes a piston 406 having an outer end that forms upper end 402 and that is in the form of a ring receiving a universal joint bearing 410 in universal joint connection with mounting plate 310. Lower end 404 of each ram 400 is also in the form of a ring receiving a universal joint bearing 410 in universal joint connection with frame 16. Specifically, universal joint bearing 410 on each of upper and lower ends 402 and 404 of each of left and right rams 400 includes a bushing 412 received in the ring and sealingly retained in the ring by two seal rings 416. A hollow bearing member 414 is received in bushing 412 and has a spherical outer periphery in rolling contact with an inner, cylindrical surface of bushing 412. Bearing member 414 further includes a through-hole 418. A first spindle 362 is extended through spindle holes 320 of lugs 318 and through-hole 418 of upper end 402 of left ram 400, allowing universal movement between upper end 402 of left ram 400 and the left side of rear end 304 of mounting plate 310. A second spindle 364 is extended through spindle holes 324 of lugs 322 and through-hole 418 of upper end 402 of right ram 400, allowing universal movement between upper end 402 of right ram 400 and the right side of rear end 304 of mounting plate 310. Lower end 404 of each ram 400 is received in one of grooves 530 between brackets 534. A third spindle 370 is extended through spindle holes 536 of brackets 534 at the left side of frame 16 and through through-hole 418 of lower end 404 of left ram 400, allowing universal movement between lower end 404 of left ram 400 and the left side of frame 16. A fourth spindle 372 is extended through spindle holes 536 of brackets 534 at the right side of frame 16 and through through-hole 418 of lower end 404 of right ram 400, allowing universal movement between lower end 404 of right ram 400 and the right side of frame 16. Other forms of universal-joint bearings 410 would be within the skill of the art. Spindles 362, 364, 370, and 372 can be of any desired form as conventional including but not limited to of a commercially available type. It can be appreciated that left and right rams 400 have equal spacing perpendicular to the second pivot axis 382.

Now that the basic construction of tilt device 300 of machine A of the preferred teachings of the present invention has been explained, the operation and some of the advantages of tilt device 300 of machine A can be set forth and appreciated. In particular, for the sake of explanation, it will be assumed that platform 58, turntable 46, mounting plate 310, cab C and boom assembly B are in a horizontal plane and that pivotal member 330 is in a vertical plane perpendicular to the horizontal plane. When rams 400 move synchronously in the extending direction at the same rate, mounting plate 310 and pivotal member 330 pivot forward relative to frame 16 about the first pivot axis 380. Boom assembly B and cab C can be in a forwardly inclined position up to 28 degrees relative to the working surface. It can be appreciated that axis pin 360 and pivotal member 330 are strong enough to bear the weight of cab C, boom assembly B, and other components on platform 58 in the forwardly inclined position. On the other hand, when rams 400 move synchronously in the retracting direction at the same rate, mounting plate 310 and pivotal member 330 pivot rearward relative to frame 16 about the first pivot axis 380. Boom assembly B and cab C can be in a rearward inclined position up to 7 degrees relative to the working surface. Thus, a total tilt angle of 35 degrees in the front/rear direction is allowed.

When left ram 400 moves in the extending direction while right ram 400 does not move, mounting plate 310 pivots rightward relative to frame 16 and pivotal member 330 about the second pivot axis 382. Similarly, when right ram 400 moves in the retracting direction while left ram 400 does not move, mounting plate 310 pivots rightward relative to frame 16 and pivotal member 330 about the second pivot axis 382. Boom assembly B and cab C can be in a rightward inclined position up to 21 degrees relative to the working surface. On the other hand, when right ram 400 moves in the extending direction while left ram 400 does not move, mounting plate 310 pivots leftward relative to frame 16 and pivotal member 330 about the second pivot axis 382. Similarly, when left ram 400 moves in the retracting direction while right ram 400 does not move, mounting plate 310 pivots leftward relative to frame 16 and pivotal member 330 about the second pivot axis 382. Boom assembly B and cab C can be in a leftward inclined position up to 21 degrees relative to the working surface. Thus, a total tilt angle of 42 degrees in the left/right direction is allowed.

When left ram 400 moves in the extending direction and right ram 400 also moves in the extending direction but at a rate larger than left ram 400, mounting plate 310 pivots leftward relative to frame 16 and pivotal member 330 about the second pivot axis 382 as well as mounting plate 310 and pivotal member 330 pivot forward relative to frame 16 about the first pivot axis 380. On the other hand, when left ram 400 moves in the extending direction and right ram 400 also moves in the extending direction but at a rate smaller than left ram 400, mounting plate 310 pivots rightward relative to frame 16 and pivotal member 330 about the second pivot axis 382 as well as mounting plate 310 and pivotal member 330 pivot forward relative to frame 16 about the first pivot axis 380. Operation of rams 400 both in the retracting direction at different rates are similar to operation of rams 400 both in the extending direction, except that mounting plate 310 and pivotal member 330 pivot rearward relative to frame 16 about the first pivot axis 380 during movement of rams 400 in the retracting direction at different rates.

When left ram 400 moves in the extending direction and right ram 400 moves in the retracting direction at the same rate, mounting plate 310 pivots rightward relative to frame 16 and pivotal member 330 about the second pivot axis 382. On the other hand, when left ram 400 moves in the retracting direction and right ram 400 moves in the extending direction at the same rate, mounting plate 310 pivots leftward relative to frame 16 and pivotal member 330 about the second pivot axis 382.

When left ram 400 moves in the extending direction and right ram 400 moves in the retracting direction at a rate smaller or larger than left ram 400, mounting plate 310 pivots rightward relative to frame 16 and pivotal member 330 about the second pivot axis 382 as well as mounting plate 310 and pivotal member 330 pivot relative to frame 16 about the first pivot axis 380. On the other hand, when left ram 400 moves in the retracting direction and right ram 400 moves in the extending direction at a rate smaller or larger than left ram 400, mounting plate 310 pivots leftward relative to frame 16 and pivotal member 330 about the second pivot axis 382 as well as mounting plate 310 and pivotal member 330 pivot relative to frame 16 about the first pivot axis 380.

Cab C and boom assembly B are rotatable about the turntable axis that is perpendicular to and intermediate the first and second pivot axes. Furthermore, the turntable axis is intermediate first and second spindles 362 and 364 and intermediate third and fourth spindles 370 and 372. Thus, by rotating turntable 46 and moving rams 400, various positions of cab C and boom assembly B can be obtained. In particular, boom assembly B and cab C can be adjusted in response to the working surface and the working environment to be in the most appropriate orientation and the most appropriate tilt state for handling material. Cab C can include a level indicator indicating the level state of cab C and boom assembly B in the front/rear direction and the left/right direction.

Now that the basic teachings of the present invention have been explained, many extensions and variations will be obvious to one having ordinary skill in the art. For example, mounting plate 310, pivotal member 330, and frame 16 can have other shapes. Upper and lower ends 402 and 404 of each ram 400 can have other arrangements of universal, pivotal connection with mounting plate 310 and frame 16. Different pivotal connections can be provided between pivotal member 330 and frame 16 and between pivotal member 330 and mounting plate 310. Further, bottom plate 532 can be omitted, and each plate 520 can be fixed to and spaced from one of lateral walls 508 of frame 16 by welding or other methods.

Tilt device 300 according to the preferred teachings of the present invention is simple in structure and can be installed without the use of the expensive circular base of conventional apparatuses. The overall height of machine A is reduced and, thus, has less limitation when passing under a bridge or restricted space. Tilt device 300 according to the preferred teachings of the present invention allows easy access to frame 16 and the components connected thereto for maintenance without adversely affecting 360° rotation and tilt of platform 58 relative to frame 16. The universal joint connections between upper and lower ends 402 and 404 of rams 400 allow smooth tilt of turntable 46. Boom assembly B and cab C utilized with tilt device 300 according to the preferred teachings of the present invention produce synergistic results of improving operator comfort and visibility as well as improving ease of maintenance while allowing 360° rotation of platform 58 and tilt in the front/rear and left/right directions of platform 58 relative to frame 16.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A machine comprising, in combination: a frame, a pivotal member pivotably mounted to the frame about a first pivot axis, a mounting plate pivotably connected to the pivotal member about a second pivot axis perpendicular to the first pivot axis, with the frame being below the pivotal member and the mounting plate in a vertical direction, with the pivotal member being intermediate the frame and the mounting plate, two rams mounted on opposite sides of the second pivot axis, with each of the two rams including a lower end spaced from the second pivot axis and pivotably connected to the frame spaced from the first pivot axis, with each of the two rams further including an upper end pivotably connected to the mounting plate and spaced from the first and second pivot axes, with the two rams each being operable to move between an extended position and a retracted position in the vertical direction, with the two rams being operable to move either synchronously or independently, and a boom assembly secured to the mounting plate, with the boom assembly, the mounting plate, and the pivotal member pivoting about the first pivot axis and/or the second pivot axis relative to the frame due to relative movement of the two rams; wherein the second pivot axis is spaced from the first pivot axis.

2. The machine as claimed in claim 1, with the pivotal member being U-shaped and including two arms and an intermediate section between the two arms, with the two arms being spaced from each other along the first pivot axis, with the two arms including aligned pivot holes extending along the first pivot axis, with the machine further comprising, in combination: first and second pins respectively extending through the pivot holes and rotatably extending through the frame and defining the first pivot axis.

3. The machine as claimed in claim 2, with the frame including two lateral walls parallel to and spaced from the second pivot axis, with the two lateral walls including aligned first pin holes extending along the first pivot axis and aligned with the pivot holes of the two arms, with the frame further including two plates parallel to and spaced from the lateral walls, with the two plates including aligned second pin holes aligned with the first pin holes, with each of the two plates and one of the lateral walls having a spacing therebetween receiving one of the two arms, and with each of the first and second pins extending through one of the pivot holes, one of the first pin holes, and one of the second pin holes.

4. The machine as claimed in claim 2, with the intermediate section of the pivotal member being spaced from the first pivot axis in a direction parallel to the second pivot axis.

5. The machine as claimed in claim 4, with the intermediate section of the pivotal member including an axis pin hole extending along the second pivot axis, with the machine further comprising, in combination: an axis pin rotatably extending through the axis pin hole of the intermediate section of the pivotal member and the mounting plate and defining the second pivot axis.

6. The machine as claimed in claim 5, with the mounting plate including first and second, parallel, spaced ears, and with the intermediate section of the pivotal member being received intermediate the first and second ears and intermediate the upper ends of the two rams and spaced from the second pivot axis.

7. The machine as claimed in claim 5, with the first and second pins being spaced from and below the axis pin along the vertical direction.

8. The machine as claimed in claim 6, with the mounting plate including a front end and a rear end spaced from the front end along the second pivot axis, with the mounting plate being pivotably connected to the pivotal member at the front end, with the rear end including first and second pairs of spaced lugs on two sides of the rear end, with the first pair of lugs being spaced from each other along a third axis parallel to and spaced from the second pivot axis, with the second pair of spaced lugs being spaced from each other along a fourth axis parallel to and spaced from the second pivot axis and the third axis, with the machine further comprising, in combination: first and second spindles respectively extending through the first and second pairs of spaced lugs and the upper ends of the two rams allowing the upper ends of the two rams to pivot relative to the mounting plate.

9. The machine as claimed in claim 8, with the first and second, parallel, spaced ears being at the front end of the mounting plate and spaced from the first and second pairs of lugs in a direction parallel to the second, third and fourth axes.

10. The machine as claimed in claim 9, with the mounting plate being annular in shape, with the annular shape including the front end and the rear end of the mounting plate, with the front end of the mounting plate including a pivotal section extending along a tangent to the annular shape, and with the first and second, parallel, spaced ears being formed in the pivotal section and parallel to the tangent of the annular shape.

11. The machine as claimed in claim 10, with each of the first pair of lugs extending outward from one of the two sides of the rear end of the annular shape, and with the second pair of lugs extending outward from another of the two sides of the rear end of the annular shape and parallel to and spaced from the first pair of lugs in a direction parallel to the first pivot axis.

12. The machine as claimed in claim 8, with the upper end of each of the two rams being in universal joint connection with the mounting plate.

13. The machine as claimed in claim 12, with the upper end of each of the two rams including a universal joint bearing having a through-hole through which one of the first and second spindles extends, allowing relative universal movement between the upper end of each of the two rams and the mounting plate.

14. The machine as claimed in claim 13, with the lower end of each of the two rams being in universal joint connection with the frame.

15. The machine as claimed in claim 14, with the lower end of each of the two rams including a universal joint bearing having a through-hole, with the machine further comprising, in combination: third and fourth spindles respectively extending through the through-holes of the lower ends of the two rams and rotatably extending through the frame allowing relative universal movement between the lower end of each of the two rams and the frame.

16. The machine as claimed in claim 15, with the frame including two lateral walls parallel to and spaced from the second pivot axis, with the two lateral walls including aligned first spindle holes spaced from the first pivot axis in the direction parallel to the second pivot axis, with the frame further including two plates parallel to and spaced from the two lateral walls and having aligned second spindle holes aligned with the first spindle holes, with each of the two plates and one of the lateral walls having a spacing therebetween receiving the lower end of one of the two rams, and with each of the third and fourth spindles extending through the through-hole of one of the lower ends of the two rams, one of the first spindle holes, and one of the second spindle holes.

17. The machine as claimed in claim 15, further comprising, in combination: means for providing mobility for the frame in the direction parallel to the second pivot axis, and with the two rams having equal spacing perpendicular to the second pivot axis.

18. The machine as claimed in claim 17, with the means for providing mobility for the frame including a track on each of two sides of the frame.

19. The machine as claimed in claim 8, with the boom assembly being rotatable about a fifth axis perpendicular to and intermediate the first and second pivot axes, with the fifth axis being intermediate the first and second spindles.

20. The machine as claimed in claim 19, further comprising, in combination: a cab receiving an operator operating the boom assembly, with the cab secured to the mounting plate and adjacent to the boom assembly, and with the cab being rotatable about the fifth axis with the boom assembly.

* * * * *

UNITED STATES PATENT AND TRADEMARK OFFICE
CERTIFICATE OF CORRECTION

| | | |
|---|---|---|
| PATENT NO. | : 8,070,170 B2 | |
| APPLICATION NO. | : 12/741115 | |
| DATED | : December 6, 2011 | |
| INVENTOR(S) | : Patrick Lee Crawford | |

It is certified that error appears in the above-identified patent and that said Letters Patent is hereby corrected as shown below:

Title page, item (73), cancel "Timberpro" and substitute therefore --TimberPro--.

Title page, before item (51) Int. Cl., insert --Related U.S. Application Data--, followed on the next line by --(60) Provisional application No. 60/987,237, filed on Nov. 12, 2007--.

Column 6, lines 10-11, cancel "universal joint" and substitute therefore --universal-joint--.

Column 8, line 29, cancel "universal joint" and substitute therefore --universal-joint--.

Column 9, line 5, cancel "aims" and substitute therefore --arms--.

Column 10, line 17, cancel "universal joint" and substitute therefore --universal-joint--.

Column 10, line 26, cancel "universal joint" and substitute therefore --universal-joint--.

Signed and Sealed this
Seventh Day of February, 2012

David J. Kappos
*Director of the United States Patent and Trademark Office*